Jan. 18, 1966  P. G. HOLT  3,230,507
AIRCRAFT LANDING APPROACH SYSTEM
Filed April 2, 1963  4 Sheets-Sheet 1

INVENTOR.
PLINY G. HOLT

ATTORNEY

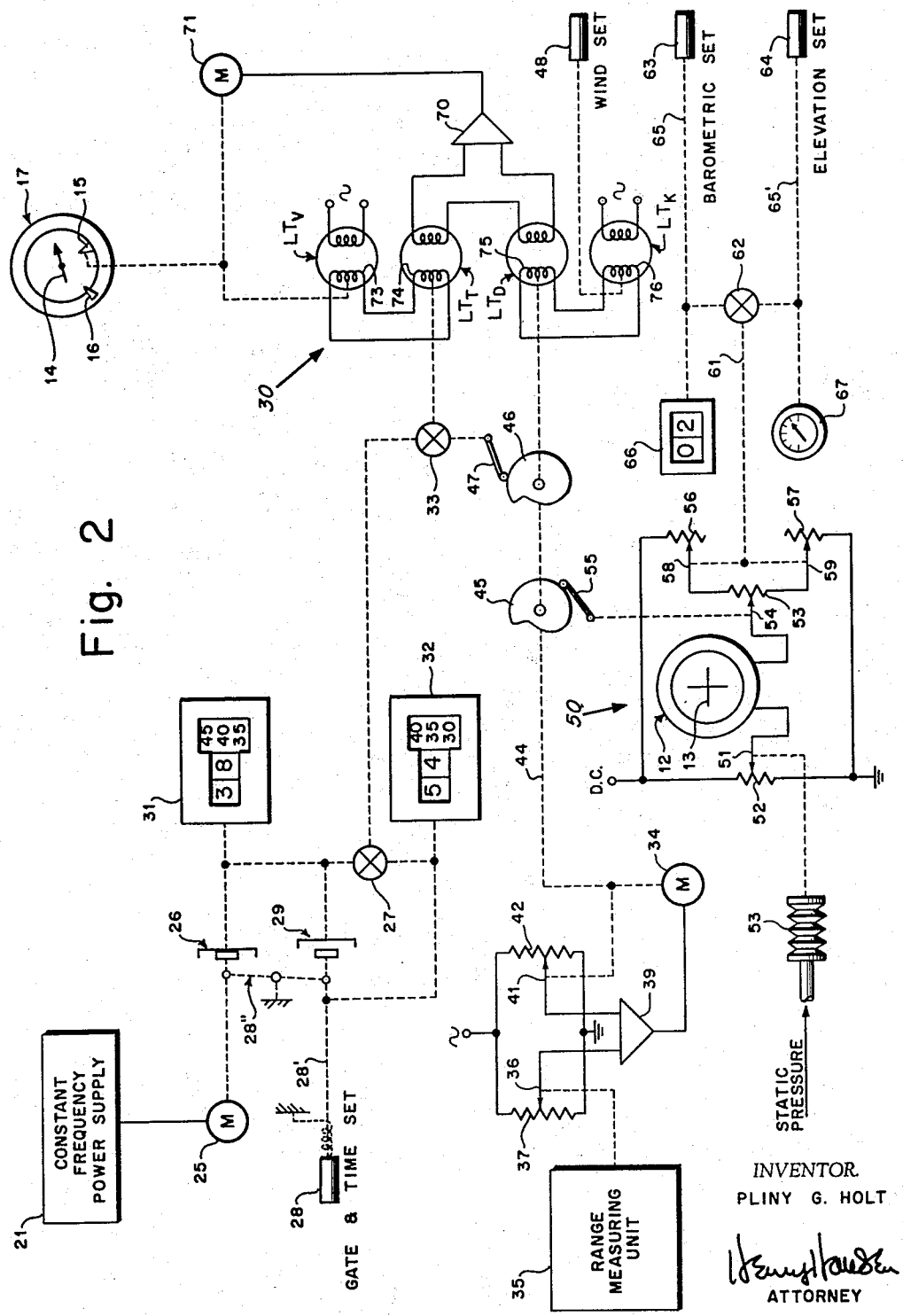

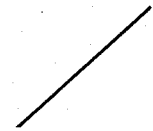

INVENTOR.
PLINY G. HOLT
BY
ATTORNEY

United States Patent Office 3,230,507
Patented Jan. 18, 1966

3,230,507
AIRCRAFT LANDING APPROACH SYSTEM
Pliny G. Holt, Bethesda, Md., assignor to the United States of America as represented by the Secretary of the Navy
Filed Apr. 2, 1963, Ser. No. 270,121
12 Claims. (Cl. 340—23)
(Granted under Title 35, U.S. Code (1952), sec. 266)

The invention described herein may be manufactured and used by or for the Government of the United States of America for governmental purposes without the payment of any royalties thereon or therefor.

This invention relates to a system for aiding a pilot in making a carrier landing at a predetermined scheduled time and more particularly to a system for computing and presenting command altitude and airspeed indications for guiding and scheduling of an aircraft's approach along a predetermined glide path.

The system presently used in directing the landing of an aircraft upon an aircraft carrier includes the tracking of the aircraft by radar situated on the carrier and continual voice communication from the carrier to the aircraft for guiding the aircraft to the carrier. It is obvious that when a plurality of aircraft are to be directed, the radar tracking becomes difficult and the many voice communications may become confusing to the various pilots. Also, an undue length of time is taken by this procedure in bringing in the many aircraft to the carrier.

It is therefore an object of the present invention to provide a substantially self-contained landing system on the aircraft which would require only a single voice communication during the landing of the aircraft on the carrier.

It is also an object of the present invention to provide a system which aids the pilot in making a carrier landing at a predetermined scheduled time by providing him with an indication of when to enter a predetermined glide path and a command speed indication to maintain a predetermined, distance to touchdown, time to touchdown, relationship during the approach.

It is a further object of the invention to provide a system and indication whereby the time interval between landings may be reduced even though the aircraft enter the glide path from various altitudes.

It is a still further object of the present invention to program an aircraft on a variable glide slope to a low altitude, to program the aircraft through a pullout to level flight at a predetermined altitude, decelerate the aircraft through a programmed deceleration from the glide slope airspeed to approach speed, signal the pilot for a wheels-down, and then program the aircraft for a constant rate of descent to landing.

It is a further object of the invention to reduce the time interval between the landing of a plurality of aircraft even though the aircraft enter the predetermined glide path from various altitudes and under all weather conditions.

Various other objects and advantages will appear from the following description of an embodiment of the invention and the novel features will be particularly pointed out hereinafter in connection with the appended claims.

Figure 4:
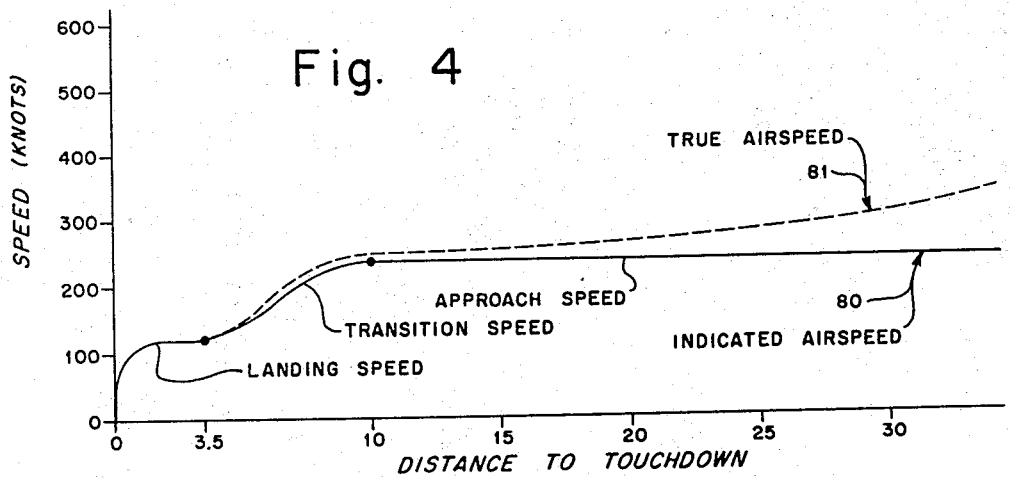
Figure 5:
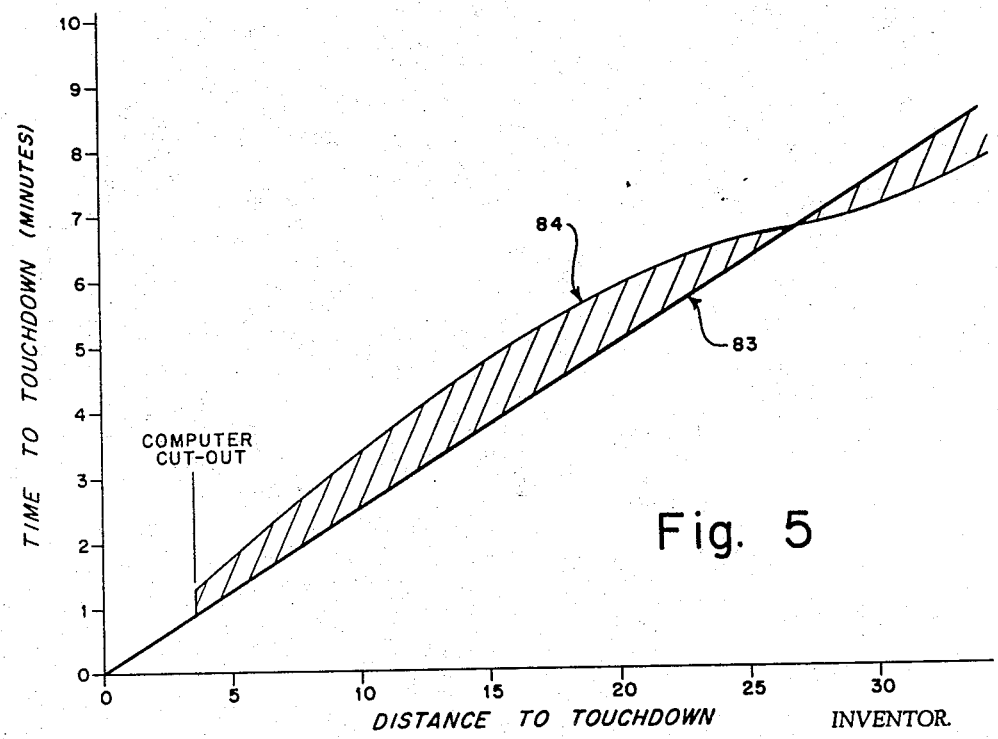

FIG. 2 illustrates a diagrammatic view of the carrier approach instrument system, FIG. 3 is a graph showing the predetermined glide path in greater detail, FIG. 4 is a graph of the desired true airspeed and the plot of the predetermined programmed command speed, FIG. 5 is a graph of the delta T cam function as indicated by the difference between the programmed time-distance relationship and the true or actual time-distance relationship obtained empirically from FIG. 4, and FIG. 6 illustrates a schematic diagram of that portion of the system not shown in FIG. 2 which indicates to the pilot the predetermined landing speed.

Figure 1A:
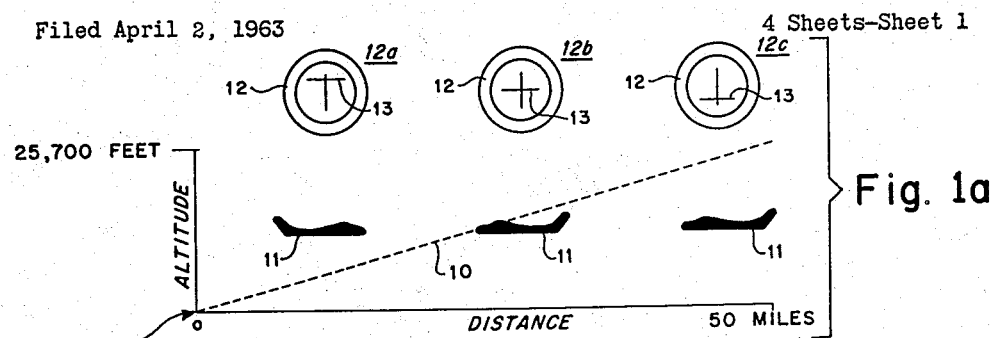
FIG. 1a illustrates the programmed altitude vs. distance plot or glide path plot and the possible command indications which may be received by the pilot while at an assigned altitude showing direction to the glide path.

Referring now to FIG. 1a of the drawing, reference element 10 is shown as illustrating the preprogrammed altitude vs. distance plot or glide path along which the aircraft 11 is to fly in its approach to the carrier. In the present embodiment of the invention this glide path is programmed within the system by the use of an altitude cam 45 which will be discussed below. For purposes of illustration and not limitation it may be assumed that the glide path extends from the carrier through a point 50 miles from the carrier at an elevation of 25,700 feet.

After the pilot manually sets the actual time, desired landing time or gate time, barometric pressure, elevation of the deck or landing field, and the relative wind component along the deck assuming the carrier is headed into the wind, on the control panel in accordance with instructions received from the carrier, the pilot flies the aircraft 11 toward or away from the carrier in order to intercept the glide path indicated by a zero reading of the altitude command signal as shown by reference numeral 12b, the altitude command signal being presented on the horizontal pointer 13 of a cross pointer indicator 12. The altitude command signals presented by horizontal pointer 13 as shown at 12a, 12b, and 12c indicate to the pilot the direction to the glide path, the cross pointer indicator 12a indicating that the pilot must fly away from the carrier in order to intercept the glide path, the cross pointer 12b indicating that the pilot has intercepted the glide path and indicator 12c indicating that the pilot must fly toward the carrier in order to intercept the glide path. It is understood of course that the positioning of the horizontal pointer 13 on the indicator 12 to reflect the relationship of the aircraft with respect to the glide path 10 is a human factor's determination and that the relative position of the pointer 13 with respect to the center of indicator 12 could be reversed as viewed in FIGS. 1a and 1d without departing from the principle of the present invention.

Figure 1B:
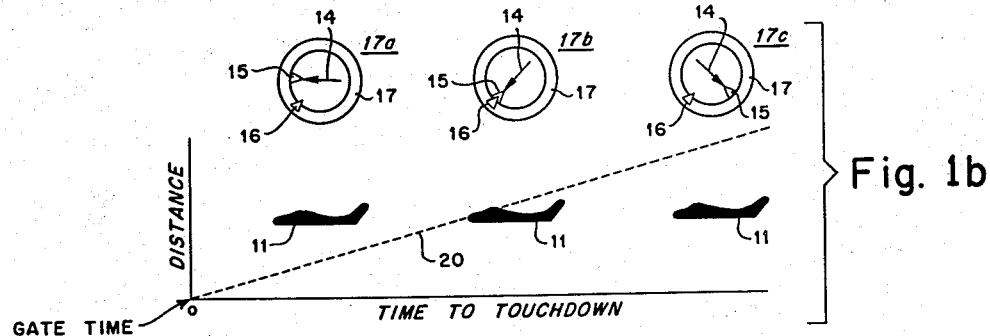
FIG. 1b illustrates the programmed distance vs. time to touchdown plot and the possible command indications which may be received by the pilot on the airspeed Mach indicator showing time to enter the glide path.

The command indication for the time to enter the glide path is presented by a command speed index 15 that moves about the periphery of a modified airspeed Mach indicator 17. The programmed distance vs. time to touchdown relationship is visually represented by reference element 20 in FIG. 1b. If the aircraft 11 is late in arriving in the vicinity of the glide path, the command index 15 will be above the fixed index 16 as shown by 17a thus indicating that the scheduled approach cannot be made.

The fixed index 16 is located on the airspeed Mach indicator 17 at a predetermined and programmed no wind speed desired to be maintained along the glide path until the final stage of the approach when it is then necessary to decelerate to landing speed. For purposes of illustration and not limitation, the programmed indicated no wind airspeed along the glide path may be considered to be 240 knots. The present instrument is configured to give the pilot this constant indicated airspeed rather than a constant rate of descent since it has been found easier for the pilot to fly under most conditions.

If the aircraft 11 is in the vicinity of the glide path prior to the time required to meet the scheduled gate time, the command speed index will be below the fixed index as shown by 17c and will gradually show an increasing speed. The proper time for entering the glide path is shown by the coincidence of the command speed index 15 and the fixed index 16 and is illustrated at 17b.

Another way of describing the situation wherin the aircraft 11 is late in arriving in the vicinity of the glide path and therefore cannot make the scheduled approach is as follows: The pilot, while at an assigned altitude, obtains a reading on his cross pointer indicator such as that shown by element 12b which indicates that the aircraft 11 is on the glide path but obtains a visual representation such as 17a on the airspeed Mach indicator 17. This latter reading indicates that although the aircraft 11 is on the glide path there is not sufficient time remaining to gate time for the aircraft to proceed at the 240 knot programmed approach speed and land on the landing strip at the appointed landing time or gate time.

Figure 1C:
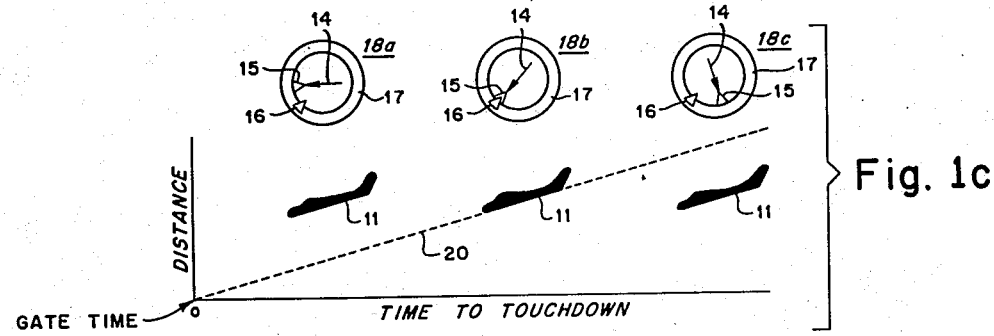
FIG. 1c illustrates the programmed distance vs. time to touchdown plot during approach and the possible command indications which may be received by the pilot on the airspeed Mach indicator showing speed along the glide path.

Referring now to FIG. 1c, during the approach to the landing deck or field the pilot adjusts his airspeed and flies at the command speed indicated by the movable command speed index 15, i.e., the pilot attempts to align the needle 14 with the command speed index 15. When the aircraft is flying at the proper and programmed speed along the glide path, the command speed index 15 will be in alignment with the fixed index 16 as shown at 18b. If the command speed falls below the fixed index 16, such as illustrated by 18c, the pilot should decrease his airspeed. Should the command indicator 15 go above the fixed marker 16, as shown at 18a of FIG. 1c, then the pilot should increase his speed. This is accomplished by matching needle 14 with index 15.

Figure 1D:
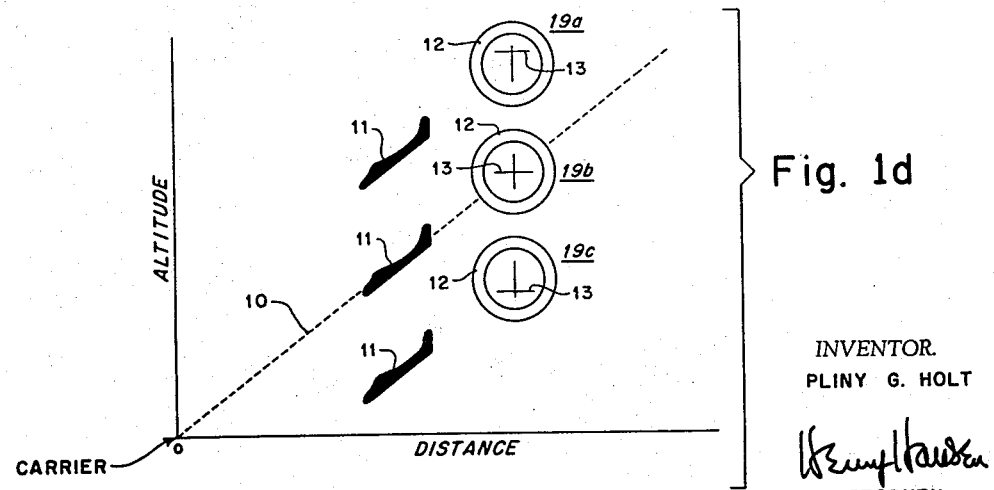
FIG. 1d illustrates the programmed altitude vs. distance or glide path plot during approach and the possible command indications which may be received by the pilot on the cross pointer showing the altitude of the aircraft relative to the glide path.

FIG. 1d illustrates the programmed altitude vs. distance plot or glide path representation 10 and the various positions that the pointer 13 may take relative to the indicator 12 depending upon the aircraft's position. During approach the horizontal pointer 13 of the cross pointer indicator 12 will indicate the relative altitude of the aircraft 11 with respect to the programmed glide path. A zero indication of the horizontal pointer 13, as shown by 19b, indicates that the aircraft is on the predetermined glide path, whereas 19a represents the indication to the pilot that would be presented if the aircraft 11 during its approach were at an altitude higher than the programmed glide path. A 19c presentation would indicate to the pilot that his aircraft is approaching the carrier at an alittude lower than the glide path.

It may be noted here that the approach system is so constructed that during the final part of the approach, for example 10 miles from the carrier, the index 15 will move and command the transition from the glide path speed of 240 knots to the desired programmed landing speed, as for example 120 knots. At this time the pilot alters his speed in order to have the airspeed indicator needle 14 follow and align itself with the index 15. When the pilot is within 3½ miles of landing, the index 15 remains stationary at the predetermined and programmed landing speed and the pilot alters his speed to maintain needle 14 on the index 15. The description of this operation and the orientation of elements will be discussed below.

Referring now to FIG. 2, it is to be noted that the illustrative embodiment of the carrier approach system herein described is designed to operate from the aircraft's 150 volt, 400 cycle single phase power and 28 volts D.C. The power supply unit 21 contains a constant frequency power source to drive a synchronous motor 25 required for a time input to the computer, generally noted at 30, and display mechanisms 12 and 17. It should be noted that self-contained constant speed motors which would not require the power supply unit may be substituted in lieu of the above recited units thereby making it possible to reduce the weight of a total system.

Referring again to FIG. 2 of the drawing, it is seen that the basic command airspeed computation is accomplished by the use of four linear transformers $LT_K$, $LT_T$, $LT_V$ and $LT_D$. These linear transformers are connected to represent the equation $D \times K = VT$ where $D$ = distance to carrier
$T$ = time to carrier plus correction (delta T) based on distance
$V$ = command velocity
$K$ = constant dependent on wind.

In order to equate both sides of the equation the output of amplifier 70 drives the servo motor 71 which in turn is mechanically connected to the command speed index 15 of the airspeed Mach indicator 17 and to the rotor 73 to drive the linear transformer $LT_V$, it being understood that the subscripts of the LT's represents their particular functions.

Again referring to FIG. 2 it is seen that controls are provided as part of the carrier approach system to set actual time (minutes and seconds past the hour), desired landing time (gate), barometric pressure, elevation of the deck (or landing field), and the relative wind component along the deck assuming the carrier is headed into the wind. An altitude signal from a pressure altitude transducer and a range signal from a range measuring unit such as a TACAN range indicator provide the required signals to complete the computation. It should be noted with respect to the TACAN transmitter that, since the range signals represent the distance to touchdown, the TACAN transmitter must be located on the carrier when the landing is made.

The input to the linear transformer $LT_T$ is derived as follows: The synchronous motor 25 which provides the time input to the computer is mechanically coupled through a normally closed clutch 26 to the mechanical differential 27 and an actual time readout 31. Also mechanically coupled to the input of the mechanical differential 27 is the gate and time setting knob 28 through a normally opened clutch 29. In operation the pilot presses in the knob 28 to set the actual time on the readout 31 through the clutch 29. Due to connection 28″, clutch 26, which is normally in the engaged or closed position, opens to prevent the manual setting of the readout 31 from feeding back to the motor 25. In order to set the gate time which had been obtained from instructions from the carrier, the pilot turns the knob 28 and then sets in the instructed gate time on the gate time indicator 32. By reason of this arrangement the counter 31 will indicate the actual time in terms of hours, minutes and seconds whereas the counter 32 will indicate the required time of touchdown. The arrangements of the clutches 26 and 29 and the mechanical differential 27 allow the linear transformer $LT_T$ to be positioned as a function of time to touchdown, that is, the difference between the preset actual time and the gate time.

It is seen that the output shaft of the mechanical differential 27 is not directly connected to the rotor 74 of the linear transformer $LT_T$ but rather interposed between the transformer and the mechanical differential 27 is a second mechanical differential 33. This second differential 33 applies a delta T time correction, based on a function of distance, to the linear transformer $LT_T$. The purpose of this correction is explained below.

The distance input to the rotor 75 of the linear transformer $LT_D$ for the computation is obtained from a position follow-up servo motor 34 that accepts the output signal from the range measuring unit indicated at 35. The output of the range measuring unit is mechanically coupled to and drives the wiper arm 36 of the range potentiometer 37, the wiper arm movement being representative of the distance between the aircraft and the aircraft carrier. The wiper arm 36 is coupled to the input side of the amplifier 39 the output of which drives the servo motor 34. In order to null the output of the amplifier, the output of the servo motor 34 is mechanically coupled to and drives the wiper arm 41 of the follow-up potentiometer 42, it being noted that potentiometer 42 and the range potentiometer 37 are each connected at one end to an electrical power supply.

In addition to mechanically driving the wiper arm 41 of the potentiometer 42, the output of servo motor 34 is utilized to drive the output shaft means 44 which in turn has connected and coupled thereto an altitude cam 45 and a delta T cam 46 and is additionally mechanically coupled to the rotor 75 of the linear transformer $LT_D$.

It should be now noted that the rotor 76 of the linear transformer $LT_K$ is positioned manually by wind set knob 48 by the pilot as a direct function of the wind component along the landing strip, which information is received from the carrier. Since this changes the slope of the time distance relationship it is important that all aircraft attempting to land on the landing strip use the same wind setting to assure proper spacing while in the glide path.

The method of computation is best understood by assuming that the entire approach is made at a constant velocity. Under this condition there is a linear relationship between time and distance to touchdown and the value of V required to solve the equation will remain constant. If the distance is less or greater than that required for the linear relationship, the command velocity V will correspondingly increase or decrease in order to guide the aircraft back to the required distance vs. time relationship.

Since the final part of the approach is not made at a constant speed and the true airspeed varies during the entire descent, the distance-time relationship is slightly nonlinear. In order to provide for the nonlinearity a correction is applied to the rotor 74 of linear transformer $LT_T$ that is a function of distance to touchdown. This function is generated by the delta T cam 46 which is secured to the output shaft 44 and which engages the follower 47 which in turn is mechanically coupled to the mechanical differential 33.

The delta T cam 46 has a construction which is derived by an empirical approach, the description of which follows:

Referring to FIGS. 3, 4 and 5, FIG. 3 illustrates a graph of the predetermined glide slope plotted as a function of altitude and distance to touchdown, the glide slope being indicated by reference element 10 and being shown in greater detail than that illustrated in FIGS. 1a and 1d. FIG. 4 is a graph plotted as a function of speed in knots and distance to touchdown. Reference element 80 illustrates a plot of the predetermined, programmed indicated airspeed, it being noted that the landing approach system is configured to give the pilot the constant no wind airspeed during approach rather than a constant rate of descent since it has been found easier for the pilot to fly under most conditions. The true airspeed curve 81 is shown in dotted lines and is obtained from the indicated airspeed graph 80 by applying to the indicated airspeed the correction due to pressure, temperature, etc., in accordance with any standard correction tables. The altitude at which the aircraft will be flying at any specified distance from the carrier must be known in using the aforementioned tables and can be obtained from the graph of FIG. 3. The true airspeed curve 81 thus obtained may now be utilized in the graph shown by FIG. 5. The graph in FIG. 5 is a function of time to touchdown and distance to touchdown, with curve 83 representing the predetermined and programmed indicated time-distance relationship or speed and curve 84 representing the true time-distance relationship. This latter-mentioned curve 84 is obtained by taking the true airspeed from curve 81 and calculating the time taken to traverse a specified increment of distance, for example, one mile and plotting this time starting at the carrier. The difference that exists between the indicated curve 83 and the true curve 84 is shown by the shaded area 85 and represents the function of the configuration of the cam, which may be used in a manner known to those skilled in the art to design and cut the cam. It should be understood that the difference between the true curve 84 and the indicated curve 83 has been exaggerated for purposes of clarity.

During the final part of the approach, for example, from 10 miles from the carrier to 3½ miles from the carrier, the cam 46 is provided with an additional correction to cause the command speed index 15 to go through the transition speed required for landing, the speed varying from 240 knots to 120 knots, for example. This additional correction may be accomplished in a manner known to those skilled in the art.

Within approximately 3½ miles of the carrier the cam 46 provides a zero correction and simultaneously an additional switching cam 91 causes the airspeed command indicator to become disconnected from the computer circuit 30 as shown by FIG. 6. By means of a collateral circuit 90 illustrated in FIG. 6, the switching cam 91 causes the command speed index 15 to remain at a predetermined fixed value required for level flight landing speed, herein indicated at 120 knots. With particular reference to FIG. 6, the above result is accomplished by an arrangement as follows: Secured to the distance output shaft 44 is a switching cam 91 which is configured to actuate the switching mechanism generally noted at 95 when the aircraft is 3½ miles from the carrier. The switching mechanism 95 comprises mutually movable members 96 and 97 coupled together through mechanical linkage means 98. Contact 99 of the switching mechanism 95 is interconnected to the wiper arm 100 of the landing speed potentiometer 101, the potentiometer being coupled to an appropriate source of power. Although not shown, the wiper arm 100 is manually adjustable by the pilot in order to set the desired landing speed indication on the command speed indicator 17. Contact 102 of mechanism 95 is interconnected with the rotors 73 and 74 of linear transformers $LT_V$ and $LT_T$, respectively, and the movable members 96 and 97 which engage contacts 102 and 99 are shown coupled to the input of the amplifier 70 and to the other terminal of the rotor 73 of the linear transformer $LT_V$, respectively. It is noted that contact 103 is connected to the transformer $LT_T$ whereas contact 104 is connected to a point of reference potential such as ground. The output of amplifier 70 drives a servo motor 71, the servo motor in turn driving the airspeed command index 15 and also interconnected with rotor 73 to null out the transformer $LT_V$.

During approach and during transition the switch is in the normally closed position, that is, where contacts 103 and 104 are engaged, and the computer 30 is operable to provide an output to move the command speed index 15. When the aircraft is 3½ miles from the carrier the output shaft 44 causes the cam 91 to actuate the switch mechanism 95 to the normally opened position whereby the computer system is cut off and the index 15 is responsive to the voltage obtained from the setting of potentiometer arm 100 on the potentiometer 101.

The altitude command signal presented on the horizontal pointer 13 of the cross pointer indicator 12 is controlled by the D.C. output signal of the resistance bridge network generally noted at 50. The wiper arm 51 of potentiometer 52 of the resistance bridge network 50 is mechanically coupled to and driven by the output of the pressure altitude transducer 53, the output of the wiper arm 51 being electrically connected to the cross pointer indicator 12. The resistance bridge network 50 further comprises a potentiometer 53 having the wiper arm 54 thereof mechanically driven by the cam-follower 55 which engages the altitude cam 45. Altitude cam 45 is in turn secured to the output shaft 44. The output of wiper arm 54 is electrically connected to the cross pointer indicator 12 in a manner similar to that mentioned above. The altitude cam 45 is cut so that the cam positioned potentiometer 53 will zero the bridge circuit 50 when the aircraft is at the required distance-altitude relationship. This will, of course, also position the horizontal pointer 13 of the cross pointer indicator 12 at the zero position.

Additional trim potentiometers 56 and 57 are provided to correct for changes in barometric pressure and for correction due to the elevation of the landing strip. The wiper arms 58 and 59 are each electrically connected to one end of the potentiometer 53 and are driven by the positioning shaft 61 of the mechanical differential 62 mechanically coupled thereto. The inputs to the mechanical differential 62 are provided by a mechanical connection between the mechanical differential 62 and the wind set correction knob 63 and between the differential 62 and the elevation set correction knob 64. It should be noted that the barometric set and the elevation set have visual readouts 66 and 67, respectively, which are connected to the input shafts 65 and 65'.

It is readily seen from the foregoing that the desired glide path speed, the transition from glide path speed to landing speed and the altitude vs. distance relationship may be preselected and programmed within the carrier approach system by the proper design of the aforementioned cams and adjustment of the constants within the system.

The operation of the aircraft landing system is as follows: After receiving the following information from the aircraft carrier the pilot manually adjusts the panel controls to set actual time (minutes and seconds past the hours), desired landing time (gate), barometric pressure, elevation of the deck (or landing fields), and the relative wind component along the deck assuming the carrier is headed into the wind. While this is being accomplished an altitude signal from the pressure altitude transducer 53 and a range signal from the range measuring unit 35 are being continually fed into the system.

As the actual time changes due to the driving of the synchronous motor 25, the time difference between the gate time and the actual time changes and this difference is represented by the output of the mechanical differential 27.

The output of the range measuring unit 35 is amplified by 39, the output driving servo motor 34. The servo motor 34 in turn drives an output shaft 44 as a function of the distance between the aircraft and the aircraft carrier. Attached to and rotating with the output shaft 44 is an altitude cam 45, a time-correction cam 46 and a switching cam 91. Depending upon the distance of the aircraft from its carrier, the cam 46 will provide through its cam follower 47 and mechanical differential 33 a correction to the time input received by the computer from the output of mechanical differential 27. This delta T cam 46 is so formed that (1) a correction is made for the nonlinearity of the distance-time relationship during the descent, (2) a sufficient correction is introduced to cause the command speed index 15 to go through the transition speed required for landing, this occurring, for example, when the aircraft is 10 miles from the carrier, and (3) a zero correction is introduced when the aircraft is within 3½ miles of the carrier. The switching cam will then actuate the collateral circuit 90 to obtain a fixed, predetermined landing speed indication on the indicator 17.

The computer 30 also has a wind set input to the linear transformer $LT_K$ representative of the wind component along the landing strip and is fed to the computer by means of wind set knob 48 and the mechanical correction thereof with the rotor 76 of the transformer $LT_K$.

The output of the computer 30 is fed to an amplifier 70, the output of which drives a servo motor 71, the servo motor in turn driving an airspeed command index 15 as a function of the computer output.

The position of the command index 15 with respect to the fixed index 16 will indicate to the pilot the time to enter the predetermined glide path. See FIG. 1b. During the approach the pilot flies at the indicated command speed which aligns the command index 15 and the fixed index 16. Any separation thereof indicates that the pilot should increase or decrease the speed of the aircraft. See FIG. 1c.

When the aircraft is 10 miles from the carrier, the delta T cam causes the command speed index to go through the transition speed required for landing. At this time the pilot changes his speed as reflected on the needle 14 of the indicator to align the needle 14 with the command index 15 which is now changing. When the aircraft is within 3½ miles of the carrier the command speed index remains at a predetermined fixed landing speed of, for example, 120 knots. Here again the pilot adjusts the speed of the aircraft to align the needle 14 with the command speed index 15.

Referring now to that part of the system which indicates the predetermined glide path to the pilot through the cross pointer indicator 12, the output from the pressure altitude transducer 53 drives the wiper arm 51 of the potentiometer 52 of the resistance bridge network 50. This arrangement picks off an output which is fed to the cross pointer indicator 12. At the same time, the altitude cam 45 and cam follower 55 drive the wiper arm 54 of the potentiometer 53, this output also being fed to the cross pointer indicator 12. The altitude cam 45 is cut so that the cam positioned potentiometer 53 will zero the bridge circuit when the aircraft is at the required distance-altitude relationship. Additional potentiometers 56 and 57 are provided to correct for changes in barometric pressure and elevation of the landing strip.

It should be further noted that whereas the pilot flies the transition speed required to be maintained to the predetermined landing speed by following the command speed index 15, which moves from the fixed index 16 to the 120 knot speed, with needle 14, it is contemplated that the delta T cam could be cut in a manner known to those skilled in the art so that in order to fly the programmed transition speed the pilot would maintain the command speed index 15 at the fixed index 16.

While at an assigned altitude, the pilot may determine the direction to the glide path by reference to the cross pointer indicator 12. See FIG. 1a. During the approach the pilot may determine the altitude of the aircraft relative to the predetermined glide path by reference to the cross pointer indicator 12. See FIG. 1d.

Therefore, it is readily seen that by means of the carrier landing approach system disclosed herein an aircraft is internally programmed to fly along a predetermined but variable glide slope and arrive at the carrier or landing field at a predetermined scheduled time. This system thereby results in minimum time being consumed between successive aircraft landings. Also, the program is presented to the pilot in a manner easiest to fly, that is, as a constant indicated airspeed.

It will be understood that various changes in the details, materials, steps and arrangements of parts which have been herein described and illustrated in order to explain the nature of the invention may be made by those skilled in the art within the principle and scope of the invention as expressed in the appended claims.

What is claimed is:

1. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, second connecting means connecting said computer to said range measuring means to receive as an input said range measuring means output, display means including a movable command speed index for indicating the command speed of the aircraft, said display means further including a fixed index for indicating the desired speed during the approach to the landing strip, means connecting the output of said computer means to said display means, said second connecting means including a time correction cam means having the cam follower thereof interconnected with said first connecting means for providing a time correction input to said computer proportional to the distance of the aircraft from the landing strip, and said time correction means having a peripheral portion designed so that when the aircraft reaches the final part of the approach, the command speed index will indicate the predetermined transition speed required for landing.

2. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, amplifier means having the output of the range measuring means fed to the input thereof, a motor driven by the output of said amplifier means, second connecting means transmitting the output of said motor to said computer means, time correction cam means driven by said motor and having the cam follower thereof interconnected with said first connecting means for providing a time correction input to said computer proportional to the distance of the aircraft from the landing strip, display means including a movable command speed index for indicating the command speed of the aircraft, said display means further including a fixed index for indicating the desired speed during the approach to the landing strip, means connecting the output of said computer means to said display means, and said time correction cam means having a peripheral portion designed so that when the aircraft reaches the final part of the approach, the command speed index will indicate the predetermined transition speed required for landing.

3. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, second connecting means connecting said computer to said range measuring means to receive as an input said range measuring means output, display means including a movable cam and speed index for indicating the command speed of the aircraft, said display means further including a fixed index for indicating the desired speed during the approach to the landing strip, means connecting the output of said computer means to said display means, said second connecting means including a time correction means interconnected with said first connecting means for providing a time correction input to said computer proportional to the distance of the aircraft from the landing strip, so that when the aircraft reaches the final part of the approach, the command speed index will indicate the predetermined transition speed required for landing, a visual altitude command display means including an indicator movable relative to an index, altitude sensing means providing an input to said altitude display means representative of the altitude of the aircraft, and said second connecting means including glide path determining means interconnected with said altitude display means for providing an input to said altitude display means in opposition to said input of said altitude sensing means whereby said movable indicator indicates the deviation of the aircraft from the predetermined glide path.

4. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, second connecting means connecting said computer to said range measuring means to receive as an input said range measuring means output, display means including a movable command speed index for indicating the command speed of the aircraft, said display means further including a fixed index for indicating the desired speed during the approach to the landing strip, means connecting the output of said computer means to said display means, said second connecting means including a time correction cam means having the cam follower thereof interconnected with said first connecting means for providing a time correction input to said computer proportional to the distance of the aircraft from the landing strip, said time correction means having a peripheral portion designed so that when the aircraft reaches the final part of the approach, the command speed index will indicate the predetermined transition speed required for landing, a visual altitude command display means including an indicator movable relative to an index, altitude sensing means providing an input to said altitude display means representative of the altitude of the aircraft, and said second connecting means also including glide path determining means interconnected with said altitude display means for providing an input to said altitude display means in opposition to said input of said altitude sensing means; whereby said movable indicator indicates the deviation of the aircraft from the predetermined glide path.

5. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, amplifier means having the output of the range measuring means fed to the input thereof, a motor driven by the output of said amplifier means, second connecting means transmitting the output of said motor to said computer means, time correction cam means driven by said motor and having the cam follower thereof interconnected with said first connecting means for providing a time correction input to said computer proportional to the distance of the aircraft from the landing strip, display means including a movable command speed index for indicating the command speed of the aircraft, said display means further including a fixed index for indicating the desired speed during the approach to the landing strip, means connecting the output of said computer means to said display means, said time correction cam means having a peripheral portion designed so that when the aircraft reaches the final part of the approach, the command speed index will indicate the predetermined transition speed required for landing, a visual altitude command display means including an indicator movable relative to an index, altitude sensing means providing an input to said altitude display means representative of the altitude of the aircraft, and said second connecting means including glide path determining means interconnected with said altitude display means for providing an input to said altitude display means in opposition to said input of said altitude sensing means; whereby said movable indicator indicates the deviation of the aircraft from the predetermined glide path.

6. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, second connecting means connecting said computer to said range measuring means to receive as an input said range measuring means output, display means including a movable command speed index for indicating the command speed of the aircraft, said display means further including a fixed index for indicating the desired speed during the approach to the landing strip, means connecting the output of said computer means to said display means, said second connecting means including a time correction means interconnected with said first connecting means for providing a time correction input to said computer proportional to the distance of the aircraft from the landing strip, so that when the aircraft reaches the final part of the approach, the command speed index will indicate the predetermined transition speed required for landing, a visual altitude command display means including an indicator movable relative to an index, resistance bridge means including first and second potentiometer means and wiper means slidable along said potentiometer providing outputs to said altitude display means, altitude sensing means connected to one of said wiper means for moving said wiper means as a function of the altitude of the aircraft, and glide path determining means interconnected with said second connecting means and said other wiper means for moving said other wiper means as a function of the distance of the aircraft from the landing strip whereby said movable indicator indicates the deviation of the aircraft from the predetermined glide path.

7. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, second connecting means connecting said computer to said range measuring means to receive as an input said range measuring means output, display means including a movable command speed index for indicating the command speed of the aircraft, said display means further including a fixed index for indicating the desired speed during the approach to the landing strip, means connecting the output of said computer means to said display means, said second connecting means including a time correction cam means having the cam follower thereof interconnected with said first connecting means for providing a time correction input to said computer proportional to the distance of the aircraft from the landing strip, said time correction means having a peripheral portion designed so that when the aircraft reaches the final part of the approach, the command speed index will indicate the predetermined transition speed required for landing, a visual altitude command display means including an indicator movable relative to an index, resistance bridge means including first and second potentiometer means and wiper means slidable along said potentiometer providing outputs to said altitude display means, altitude sensing means connected to one of said wiper means for moving said wiper means as a function of the altitude of the aircraft, and glide path determining means interconnected with said second connecting means and said other wiper means for moving said other wiper means as a function of the distance of the aircraft from the landing strip; whereby said movable indicator indicates the deviation of the aircraft from the predetermined glide path.

8. An aircraft landing system for programming an aircraft on a predetermined variable glide slope to a low altitude, through a pullout to level flight at a predetermined altitude, for programming the aircraft deceleration from the glide slope airspeed to approach speed, and then programming the aircraft for a constant rate of descent to land comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, amplifier means having the output of the range measuring means fed to the input thereof, a motor driven by the output of said amplifier means, second connecting means transmitting the output of said motor to said computer means, time correction cam means driven by said motor and having the cam follower thereof interconnected with said first connecting means for providing a time correction input to said computer proportional to the distance of the aircraft from the landing strip, display means including a movable command speed index for indicating the command speed of the aircraft, said display means further including a fixed index for indicating the desired speed during the approach to the landing strip, means connecting the output of said computer means to said display means, said time correction cam means having a peripheral portion designed so that when the aircraft reaches the final part of the approach, the command speed index will indicate the predetermined transition speed required for landing, a visual altitude command display means including an indicator movable relative to an index, resistance bridge means including first and second potentiometer means and wiper means slidable along said potentiometer providing outputs to said altitude display means, altitude sensing means connected to one of said wiper means for moving said wiper means as a function of the altitude of the aircraft, and glide path determining means interconnected with said second connecting means and said other wiper means for moving said other wiper means as a function of the distance of the aircraft from the landing strip whereby said movable indicator indicates the deviation of the aircraft from the predetermined glide path.

9. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, second connecting means connecting said computer to said range measuring means to receive as an input said range measuring means output, display means including a movable command speed index for indicating the command speed of the aircraft, said display means further including a fixed index for indicating the desired speed during the approach to the landing strip, means connecting the output of said computer means to said display means, said second connecting means including a time correction means interconnected with said first connecting means for providing a time correction input to said computer proportional to the distance of the aircraft from the landing strip, so that when the aircraft reaches the final part of the approach, the command speed index will indicate the predetermined transition speed required for landing, a visual altitude command display means including an indicator movable relative to an index, resistance bridge means including first and second potentiometer means and wiper means slidable along said potentiometer means providing outputs to said altitude display means, altitude sensing means connected to one of said wiper means for moving said wiper means as a function of the altitude of the aircraft, glide path cam means driven by said motor and having the follower thereof connected to said other wiper means for moving said other wiper means as a function of the distance of the aircraft from the landing strip, and said glide path cam means having a peripheral portion designed so that the output transmitted to said altitude display means from said other wiper means will be equal to the output transmitted to said altitude display means from said one wiper means when the aircraft is at the required distance altitude relationship.

10. An aircraft landing system for providing a pilot an indication of when to enter a predetermined glide path, and for providing a command speed indication to aid the pilot in maintaining a predetermined distance to touchdown, time to touchdown relationship during the approach in order that the aircraft land at a predetermined scheduled time comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, second connecting means connecting said computer to said range measuring means to receive as an input said range measuring means output, display means including a movable command speed index for indicating the command speed of the aircraft, said display means further including a fixed index for indicating the desired speed during the approach to the landing strip, means connecting the output of said computer means to said display means, said second connecting means including a time correction cam means having the cam follower thereof interconnected with said first connecting means for providing a time correction input to said computer proportional to the distance of the aircraft from the landing strip, said time correction means having a peripheral portion designed so that when the aircraft reaches the final part of the approach, the command speed index will indicate the predetermined transition speed required for landing, a visual altitude command display means including an indicator movable relative to an index, resistance bridge means including first and second potentiometer means and wiper means slidable along said potentiometer means providing outputs to said altitude display means, altitude sensing means connected to one of said wiper means for moving said wiper means as a function of the altitude of the aircraft, glide path cam means driven by said motor and having the follower thereof connected to said other wiper means for moving said other wiper means as a function of the distance of the aircraft from the landing strip, and said glide path cam means having a peripheral portion designed so that the output transmitted to said altitude display means from said other wiper means will be equal to the output transmitted to said altitude display means from said one wiper means when the aircraft is at the required distance altitude relationship.

11. An aircraft landing system for programming an aircraft on a predetermined variable glide slope to a low altitude, through a pull out to level flight at a predetermined altitude, for programming the aircraft deceleration from the glide slope airspeed to approach speed, and then programming the aircraft for a constant rate of descent to landing comprising:

computer means, manual means for setting the actual time and for setting the scheduled landing time, first means continuously providing an output representative of the time remaining to said scheduled preset landing time, first connecting means connecting said computer to said first means to receive as an input said first means output, range measuring means having an output representative of the distance between the aircraft and the landing strip, amplifier means having the output of the range measuring means fed to the input thereof, a motor driven by the output of said amplifier means, second connecting means transmitting the output of said motor to said computer means, time correction cam means driven by said motor and having the cam follower thereof interconnected with said first connecting means for providing a time correction input to said computer proportional to the distance from the aircraft from the landing strip, display means including a movable command speed index for indicating the command speed of the aircraft, said display means further including a fixed index for indicating the desired speed during the approach to the landing strip, means connecting the output of said computer means to said display means, said time correction cam means having a peripheral portion designed so that when the aircraft reaches the final part of the approach, the command speed index will indicate the predetermined transition speed required for landing, a visual altitude command display means including an indicator movable relative to an index, resistance bridge means including first and second potentiometer means and wiper means slidable along said potentiometer means providing outputs to said altitude display means, altitude sensing means connected to one of said wiper means for moving said wiper means as a function of the altitude of the aircraft, glide path cam means driven by said motor and having the follower thereof connected to said other wiper means for moving said other wiper means as a function of the distance of the aircraft from the landing strip, and said glide path cam means having a peripheral portion designed so that the output transmitted to said altitude display means from said other wiper means will be equal to the output transmitted to said altitude display means from said one wiper means when the aircraft is at the required distance altitude relationship.

12. The system of claim 11 wherein said resistance bridge means includes trim potentiometer means, and manual means for providing elevation and barometric corrections connected to the trim wiper means of said trim potentiometer means for moving said trim wiper means and correcting said output to said display means as a function of the elevation and barometric pressure.

References Cited by the Examiner

UNITED STATES PATENTS 2,878,469   3/1959   Casabona _____ 343—112

NEIL C. READ, *Primary Examiner.*

A. H. WARING, *Assistant Examiner.*